(12) United States Patent
Smith (10) Patent No.: US 10,391,826 B2
(45) Date of Patent: Aug. 27, 2019

(54) GANGWAY FOR CONNECTING A FIRST CAR WITH A SECOND CAR

(71) Applicant: Dellner Couplers AB, Falun (SE)

(72) Inventor: Graham Smith, Gwent (GB)

(73) Assignee: Dellner Couplers AB, Falun (SE)

( * ) Notice: Subject to any disclaimer, the term of this patent is extended or adjusted under 35 U.S.C. 154(b) by 0 days.

(21) Appl. No.: 15/512,405

(22) PCT Filed: Sep. 17, 2015

(86) PCT No.: PCT/EP2015/001860
§ 371 (c)(1),
(2) Date: Mar. 17, 2017

(87) PCT Pub. No.: WO2016/041638
PCT Pub. Date: Mar. 24, 2016

(65) Prior Publication Data
US 2017/0274715 A1    Sep. 28, 2017

(30) Foreign Application Priority Data

Sep. 19, 2014  (EP) .................................. 14003250

(51) Int. Cl.
*B60D 5/00* (2006.01)
*B61D 17/20* (2006.01)

(52) U.S. Cl.
CPC ............. *B60D 5/003* (2013.01); *B61D 17/20* (2013.01)

(58) Field of Classification Search
CPC ................................ B61D 17/22; B60D 5/003
See application file for complete search history.

(56) References Cited

U.S. PATENT DOCUMENTS

| | | | |
|---|---|---|---|
| 2016/0046161 A1* | 2/2016 | Piacsek | B60D 5/00 280/403 |
| 2016/0121910 A1* | 5/2016 | Smith | B60D 5/003 105/15 |
| 2016/0288804 A1* | 10/2016 | Goebels | B60D 5/003 |
| 2017/0240012 A1* | 8/2017 | Browne | B60D 1/64 |
| 2017/0297638 A1* | 10/2017 | Tatzel | B62D 47/025 |

FOREIGN PATENT DOCUMENTS

| | | |
|---|---|---|
| CN | 103303082 A | 9/2013 |
| DE | 3617325 A1 | 11/1987 |
| DE | 202013100563 U1 | 2/2013 |
| EP | 0631890 A1 | 1/1995 |
| EP | 2810845 A1 | 12/2014 |
| FR | 2682345 A1 | 4/1993 |

OTHER PUBLICATIONS

International Search Report dated Jan. 22, 2016 for related PCT Application No. PCT/EP2015/001860.

* cited by examiner

*Primary Examiner* — Kevin Hurley
(74) *Attorney, Agent, or Firm* — Howard IP Law Group (57) ABSTRACT

A gangway for connecting a first car with a second car and allowing passage of passengers from the first car to the second car, has a first hoop for attaching the gangway to the first car, a second hoop for attaching the gangway to the second car, a third hoop and a fourth hoop, the third and fourth hoops being arranged between the first hoop and the second hoop. A connection element is arranged between the third hoop and the fourth hoop and elastically connects the third hoop to the fourth hoop.

17 Claims, 7 Drawing Sheets

GANGWAY FOR CONNECTING A FIRST CAR WITH A SECOND CAR

CROSS-REFERENCE TO RELATED APPLICATIONS

This application is a national phase application under 35 U.S.C. § 371 of International Patent Application No. PCT/EP2015/001860 filed Sep. 17, 2015, which claims priority to European Application No. 14 003 250.9 filed Sep. 19, 2014, the entire contents of all of which are incorporated herein by reference for all purposes.

FIELD OF THE INVENTION

The invention relates to a gangway for connecting a first car with a second car.

BACKGROUND OF THE INVENTION

Multi-car vehicles are known in different designs and in different forms of adaptation for uses. Multi-car vehicles, for example, railway-bound trains (street cars and subway-trains also being considered as such trains) are known and are known for the purpose of transporting passengers as well as transporting goods. Further types of multi-car vehicles can be magnetic railway trains or can be buses (road buses as well as buses travelling on fixed tracks). A car of a multi-car vehicle can be a self-supporting car, whereby the car has sufficient wheels that are placed at sufficient locations such that the car can stand by itself without being supported by other cars, for example a three-wheeled car, a four wheeled car or a car with even more wheels placed suitable locations. A car of a multi-car vehicle can also be of the non-self-supporting type, whereby the car has no wheels or only wheels provided in such number or arranged at such a place that the car can not stand by itself, but is vertically supported by at least one neighbouring car.

The present invention pertains to a gangway that can in a preferred embodiment be used with such types of multi-car vehicles and is suitable to connect a first car with a second car and to allow passage of passengers from the first car to the second car. In the majority of embodiments, the cars of the multi-car vehicle will be connected by a separate connecting device, for example a coupler, that connects the cars in a manner allowing the transmittal of substantial pulling and pushing forces. In the majority of cases, the gangway is designed separately and predominantly designed with the requirements for the passage of passengers from the first car to the second car in mind.

A gangway is typically suitable to shield the passenger from outside influences. One problem to be solved in this context is to ensure that the passenger is shielded from the outside in all operational modes that the gangway will take. A further problem to be solved is to prevent obstacles within the gangway that can harm the passenger. Also, gangways should preferably have a large internal width that allows easy passage of the passengers from the one car to the other car.

Figure 5:
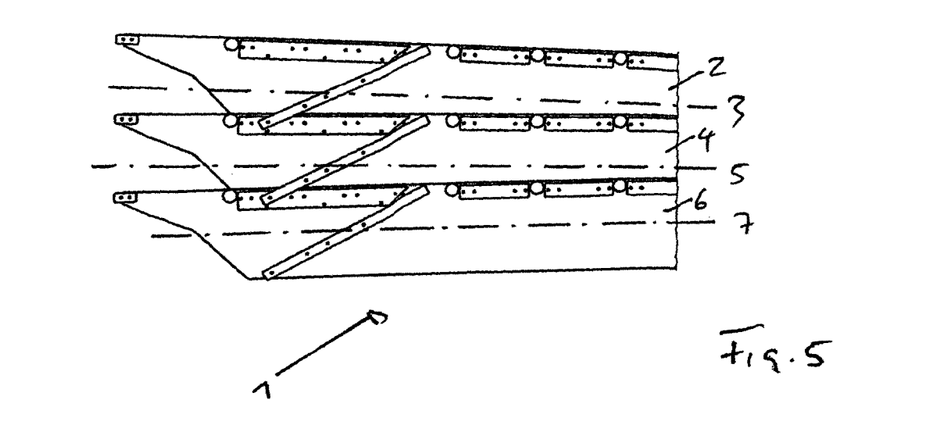
FIG. 5 shows a view from below onto a portion of the structure of FIG. 1 in a fifth operational mode.

Gangways usually have at a first hoop for attaching the gangway to the first car and a second hoop for attaching the gangway to the second car. These hoops are often also called frames. Some designs of gangways have one further hoop arranged equidistantly between the first hoop and the second hoop, which is often called the centre hoop or centre frame. Such a design of a gangway is known from DE 20 2013 100 563 U1 that in FIG. 5 shows the hoops of the gangway. The middle frame 25 is made up of two elements fixedly attached to each other.

The disadvantage of this design is that when going around a bend, the part of the gangway between the first hoop and the centre hoop will take up the shape of a parallelogram as well as the part of the gangway between the first hoop and the centre hoop will take up the shape of a parallelogram (see FIG. 11 or 12 for example). This will lead to a reduction of cross section that the passengers can pass through.

Figure 3:
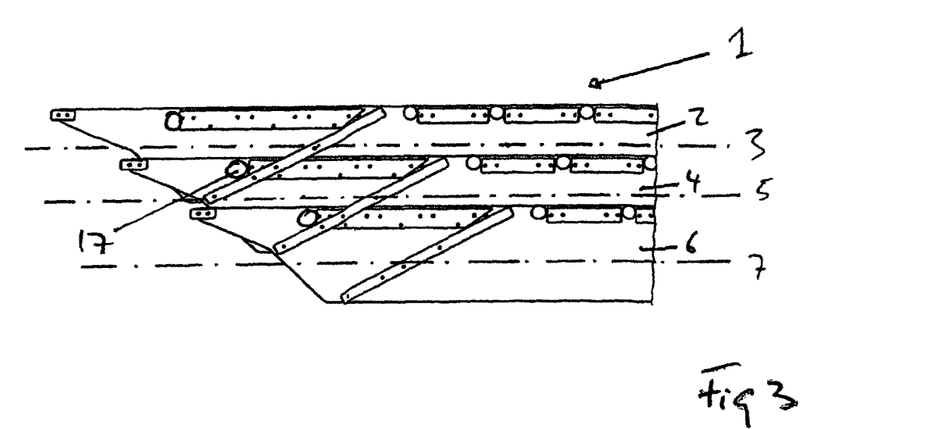
FIG. 3 shows a view from below onto a portion of the structure of FIG. 1 in a third operational mode.
Figure 4:
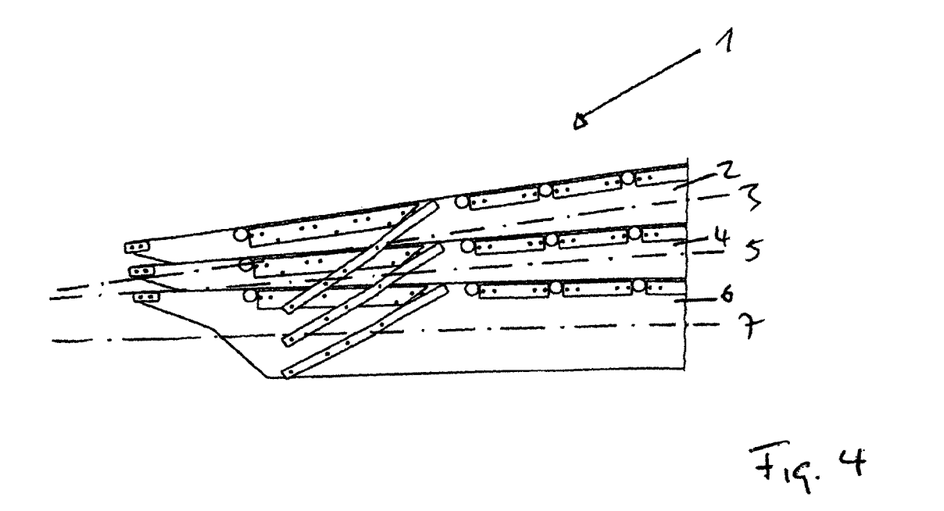
FIG. 4 shows a view from below onto a portion of the structure of FIG. 1 in a fourth operational mode.

The design of DE 20 2013 100 563 U1 also has the problem that the bellows need to be designed strong enough to carry inwardly protruding elements that hold the passenger away from the edges of the tread-plates (see for example FIGS. 3 and 4). To carry these protruding elements, the bellows often have supporting bars sewn into them. This additional load on the bellows reduces the lifetime of the bellows, which already are the least long lasting element of a gangway.

SUMMARY OF THE INVENTION

Given this background, the problem to be solved by the invention is to increase the space that the passenger can pass through even as the multi-car vehicle is going through a bend as well as to provide for a design that allows the lifetime of the gangway to be increased.

This problem is solved by the gangway disclosed herein.

The invention is based on the basic idea to dissect a gangway into a series of little gangways, each having two end hoops. In providing a third and a fourth hoop between the first hoop and the second hoop, the gangway according to the invention in this embodiment is made up of three small gangways, one between the first hoop and the third hoop, one between the third hoop and the fourth hoop and one between the fourth hoop and the second hoop. Providing the connection element that elastically connects the third hoop to the fourth hoop pretensions the third hoop and the fourth hoop into a predetermined orientation relative to each other if no additional forces act on these two hoops. This ensures that the third hoop and fourth hoop do not stick together, but properly span apart from each other. In a preferred embodiment, the use of the connection element even allows the sides of the hoops on the inside of the bend to be held equidistantly apart from each other and/or allows the sides of the hoops on the outside of the bend to be held equidistantly apart from each other. This does away with the gangway taking up the shape of a parallelogram and increases the space the passenger can pass through.

Dissecting the gangway in a series of little gangways makes the gangway suitable to mass-production even when it is to be applied to different multi-car vehicles. The length of the gangway according to the invention can easily be adapted by adding any number of further hoops.

Additionally the increased number of hoops allows for further elements of the gangway to be connected to the hoops rather than being connected to the bellows. This allows for a re-design of the bellows. These can be designed lighter as they need not take up so much load and can be more purposefully designed to be long lasting without the limitation of having to take up substantial loads.

In a preferred embodiment, three hoops are arranged between the first hoop and the second hoop. Especially preferred five hoops or more than five hoops are arranged between the first hoop and the second hoop. The more hoops there are arranged between the first hoop and the second hoop, the more closely the gangway will follow bends that the multi-car vehicle might drive through.

In a preferred embodiment, one connection element each is arranged between the majority, preferably between each of the neighbouring hoops of the gangway. The more pairs of hoops there are in the gangway that are connected by a connection element, the more easily the shape of the gangway can be controlled by pretensioning the hoops of the gangway into a predetermined position.

In a preferred embodiment, two or even four connection elements are each arranged between the majority, preferably between each of the neighbouring hoops of the gangway. The hoops of the gangway in a preferred embodiment have a generally rectangular frame shape. In such an embodiment, one connection element each can be arranged in each of two or even more preferred in each of the four corners of the hoop. This allows for a good introduction of pretension-force from the connection elements into the hoop they are connected to. Additionally, this arrangement of connection elements also allows for better control of the shape of the gangway with respect to bending movements about a vertical as well as about a horizontal axis.

In a preferred embodiment the hoops are made from vacuum moulded panels or from extruded panels, for example from aluminium extruded profiles. In a preferred embodiment, the hoops are made from open profiles or from close, rolled profiles.

In a preferred embodiment the hoops have an essentially rectangular, preferably quadratic shape, the corners in a preferred embodiment being rounded or chamfered or bevelled. Preferably, a respective hoop is made up of joint together beams.

In a preferred embodiment the hoop envelopes an area that is large enough for a passenger to pass through. Preferably at least somewhere along the circumference of the hoop, the distance between to opposite points on the hoop, preferably the distance between two parallel beams that form part of the hoop if the hoop is of rectangular shape, is larger than 1.5 m, preferably larger than 1.75 m, preferably larger than 2 m, preferably larger than 2.5 m, preferably larger than 3 m. Especially such a design of the hoops allows the hoops to envelope an area that is large enough for a passenger to pass through.

In a preferred embodiment a section of the hoop extends along a straight line and has a height (vertical direction of a horizontally extending section) of less than 50 cm, preferably less than 40 cm and even more preferred less than 30 cm and has a width of less than 30 cm, preferably less than 20 cm and even more preferred of less than 10 cm.

In a preferred embodiment, the hoops of the gangway are arranged such that in one operational mode of the gangway, the respective centre of mass of the hoops lie on a straight line, preferably a straight line that is perpendicular to the respective plane in which a respective hoop lies in. This operational mode is preferably the operational mode that the gangway takes up, when built in between two cars that travel along a straight line on level ground.

In a preferred embodiment, the shape of the connection element is substantially smaller than the hoop. Especially the horizontal extend perpendicular to the longitudinal axis and/or the vertical extend of the connection element is substantially smaller than the respective extend of the hoop, especially less than 50%, even more preferred less than 25% and particularly preferred less than 10% of the respective extend of the hoop. The longitudinal axis of the gangway is understood to be the axis that points in the direction from the first car to the second car, if the first car and the second car are arranged in a straight line on an even plane. In a preferred embodiment, the connection element is not a bellows and not a part of the bellows, especially not a convolute of a plurality of convolutes that make up a bellows. If the gangway according to the invention in a preferred embodiment is provided with a bellows, the connection element is provided additionally to the convolutes.

In a preferred embodiment, the connection element is a coil spring that is connected with one end to one hoop and the opposite to the neighbouring hoop or a spring leave that is connected with both its ends to one hoop and with its middle section to the neighbouring hoop or a horse-shoe-shaped elastic element that has one of its two parallel extending longitudinally shaped sections connected to the one hoop and the other longitudinally shaped sections connected to the neighbouring hoop or a ring shaped elastic element with a part of its circumference being connected to one hoop and the opposite part of the circumference being connected to the neighbouring hoop; the ring shaped elastic element preferably in a driving condition where the first car and second car that are connected by the gangway are arranged in a straight line and on an even plane having a circular shape or the shape of an ellipse, preferably of an ellipse that has the longer axis extending perpendicular to the longitudinal axis or a pneumatic or hydraulic element, for example a fluid filled cushion.

In a preferred embodiment all connection elements of the gangway are of the same type and each hoop is arranged at the same distance to its neighbouring hoop in a driving condition where the first car and second car that are connected by the gangway are arranged in a straight line and on an even plane. This leads to the advantageous effect that even if the multi-car vehicle then drives through a bend, the connection elements being the same and the starting position of the hoops being equidistant, the hoops will squeeze together on the one side of the gangway and spread on the other side of the gangway, but keep their equidistant arrangement relative to each other.

In a preferred embodiment the hoops arranged between the first hoop and the second hoop rest on a support beam. The support beam thus takes up the weight of the hoops as well as the load that is taken up by the hoops, for example from elements attached to the hoops. In a preferred embodiment, the hoops rest on the support beam, but are arranged to travel freely along the beam and in an even preferred embodiment are designed to allow to swivel relative to the support beam, for example when the hoops fan out as the multi-car vehicle drives around a bend. This can most easily be arranged if a longitudinal, horizontal section of each hoop rests on the support beam.

In a preferred embodiment the hoops arranged between the first hoop and the second hoop rest on more than one support beam, preferably on two, possibly on three or four support beams. Using more than one support beam allows for the weight to be distributed over several beams, which facilitates to introduce this weight into the first and second car (if the support beams in a preferred embodiment of a multi-car vehicle are supported by the first car and the second car), because the introduction of weight can be spread over several contact points, or it facilitates to introduce the weight into a coupler or a bogie arranged below the gangway, if the gangway in a preferred embodiment of a multi-car vehicle is arranged to be (at least partially) supported by a coupler or a bogie between the first car and the second car.

In a preferred embodiment one support beam is arranged closer to the one side of the gangway, while a second support beam is arranged closer to the opposite side of the gangway. These two support beams can be arranged below the lower horizontally extending longitudinal sections of the hoops, which are the ones below the floor panels of the gangway. Alternatively or in addition, two support beams can be arranged in this fashion between the upper horizontally extending longitudinal sections of the hoops and the ceiling that delimits the space that the passengers can pass through.

In a preferred embodiment the majority of the hoops, preferably all hoops have a hole, whereby an alignment beam is arranged to pass through the holes. Preferably, there is a clearance between the outer circumference of the alignment beam and the parts of the hoops that delimit the respective hole. This arrangement ensures that the hoops—with a tolerance defined by the amount of clearance—take predefined positions relative to each other in the direction perpendicular to the longitudinal extend of the alignment beam.

In a preferred embodiment, an element is arranged between two neighbouring hoops to prevent the hoops to come closer to each other than a first distance defined by the thickness of the element. Providing such an element assists the equidistant arrangement of the panels in the operational modes where certain sections of the respective hoops moved closer to one another. In a preferred embodiment, the element is protruding from one hoop towards the neighbouring hoop and preferably has a tapered shape, which facilitates the hoops to take up a position, where the respective planes that the respective hoops are generally arranged in are at an angle to one another.

In a preferred embodiment, the element that is arranged protruding from the hoop has an elastic coating to dampen the contact of the neighbouring hoop with the protruding element, when the neighbouring hoop abuts against the protruding element.

The gangway according to the invention is suitable for connecting a first car with a second car and allowing passage of passengers from the first car to the second car and has a floor, two sidewalls and a ceiling.

In a preferred embodiment the gangway has a bellows. In a preferred embodiment, the bellows defines at least a part of the envelope of the gangway, for example defines the outward facing part of the sidewalls and the ceiling of the gangway, while being open below the parts of the floor of the gangway that are intended for the passenger to tread on, or for example defines the outward facing part of the sidewalls, the floor and the ceiling of the gangway, thus fully encompassing the gangway while only being open at the front of the gangway that faces the one car and the back of the gangway that faces the other car. In a preferred embodiment, the bellows is of polymer material and is fastened to the hoops. In a preferred embodiment, the bottom panel of the bellows can be removed for maintenance access. In a preferred embodiment, the bellows is a polymer laminate with exterior fabric layer that has printed pattern on it for aesthetic appearance.

In a preferred embodiment, the bellows is attached to the hoops. This allows the hoops to support the bellows. In an alternative embodiment, a separate support structure for the bellows can be provided.

The description of the invention makes reference to operational modes. This accounts for the fact that the gangway according to the invention has parts that can take up different positions relative to other parts of the gangway respectively. In a preferred embodiment the gangway according to the invention has a first operational mode. Preferably, the first operational mode of the gangway is the mode that the gangway is in when it is built in between a first car and a second car and the first and the second car are travelling along a straight line on a level surface.

In a preferred embodiment the gangway can take up an operational mode in which the floor approximately takes up the shape of a small segment of a ring or a donut, one sidewall being outwardly bend to be approximately the shape of an segmented round arch and the opposite sidewall being inwardly bend to be approximately the shape of an segmented round arch, for example if the gangway is built between two cars that go around a bend.

In a preferred embodiment the gangway can take up an operational mode in which the floor approximately takes up the shape of a rectangle, preferably a square, and the sidewalls take up a the shape of a non-rectangular parallelogram, for example if the gangway is built between two cars that go in a straight line, with the longitudinal axis of the two cars being coaxial, but with the end of the first car being lower than the neighbouring end of the second car.

In a preferred embodiment the gangway can take up an operational mode in which the sidewalls approximately takes up the shape of a rectangle, preferably a square, and the floor takes up a the shape of a non-rectangular parallelogram, for example if the gangway is built between two cars that go in a straight line, with the longitudinal axis of the two cars being parallel and in the same horizontal plane, but not coaxial.

According to a further alternative or additional aspect of the invention a gangway has bellows made up of a series of convolutes, at least the majority of convolute approximately having the cross-sectional shape of a horse-shoe and a first convolute being connected to a second neighbouring convolute by means of attaching the one elongated section of the first horse-shoe shaped convolute to one elongated section of the second horse-shoe shaped convolute, whereby the connection allows the one elongated section of the first horse-shoe shaped convolute to slide relative to the one elongated section of the second horse-shoe shaped convolute. Preferably the connection is formed by protruding elements that are connected to the one elongated section of the first horse-shoe shaped convolute and a channel connected to one elongated section of the second horse-shoe shaped convolute, whereby the protruding elements are held inside the channel in such a manner that the protruding elements can slide along the channel, thereby allowing the one elongated section of the first horse-shoe shaped convolute to slide relative to the one elongated section of the second horse-shoe shaped convolute.

The bellows can be used to make up the inward facing ceiling of a gangway, but can also be used as the bellows that envelope the gangway on the outside. Also, the bellows can be used below the floor of a gangway.

In a preferred embodiment, the convolutes are made of rubber or a composite material that comprises rubber.

In a preferred embodiment, the gangway according to the invention does not have a structure that is suitable to form part of a floor, a sidewall or a ceiling of a gangway, which gangway is suitable to connect a first car with a second car and to allow passage of passengers from the first car to the second car, comprising a first elongated panel that extends along a first longitudinal axis and a second elongated panel that extends along a second longitudinal axis and an elongated end-panel that extends along a third longitudinal axis, the first elongated panel, the second elongated panel and the elongated end-panel each having a front end and a back end respectively as well as each having a front and a back, whereby the first elongated panel overlaps the second elongated panel such that the back end of the first elongated panel is in front of the front of the second elongated panel and the front end of the second elongated panel is behind the back of the first elongated panel and the second elongated panel overlaps the elongated end-panel such that the back end of the second elongated panel is in front of the front of the elongated end-panel and the front end of the elongated end-panel is behind the back of the second elongated panel or whereby the first elongated panel overlaps the second elongated panel such that the back end of the first elongated panel is in behind the back of the second elongated panel and the front end of the second elongated panel is in front of the front of the first elongated panel and the second elongated panel overlaps the elongated end-panel such that the back end of the second elongated panel is behind the back of the elongated end-panel and the front end of the elongated end-panel is in front of the front the back of the second elongated panel.

Such a structure might prove to have too many parts to arrange in a gangway.

In a preferred embodiment the gangway according to the invention is built between a first car and a second car of a multi-car vehicle, the multi-car vehicles being railway-bound trains (street cars and subway-trains also being considered as such trains) or a magnetic railway trains or a bus (road buses as well as buses travelling on fixed tracks). A car of a multi-car vehicle can be a self-supporting cars, whereby the car has sufficient wheels that are placed at sufficient locations such that the car can stand by itself without being supported by other cars, for example a three-wheeled car, a four wheeled car or a car with even more wheels placed suitable locations. A car of a multi-car vehicle can also be of the non-self-supporting type, whereby the car has no wheels or only wheels provided in such number or arranged at such a place that the car can not stand by itself, but is vertically supported by at least one neighbouring car.

BRIEF DESCRIPTION OF THE DRAWINGS

Below the invention will be described with reference to Figures that only show exemplary embodiments of the invention. In those Figures

DETAILED DESCRIPTION

Figure 1:
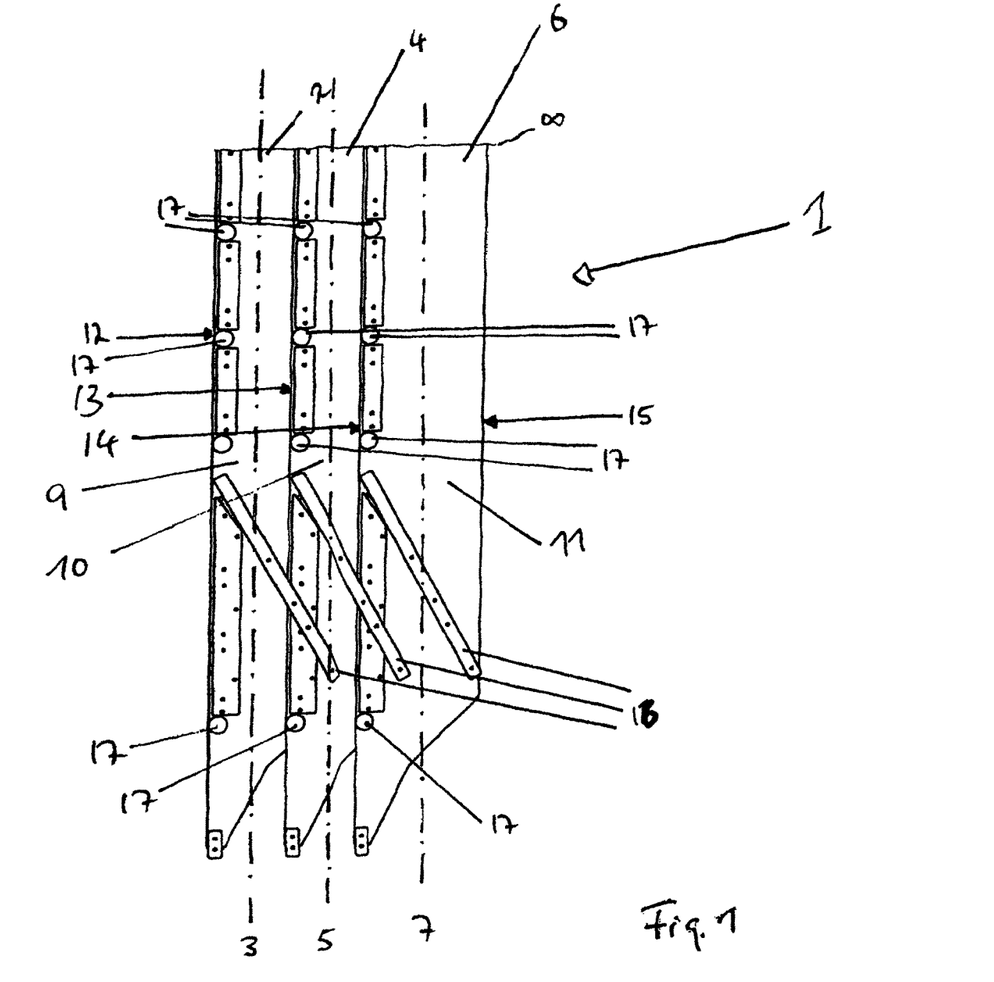
FIG. 1 shows a view from below onto a portion of a structure with the structure being in a first operational model.

FIG. 1 shows a part of structure 1 that is suitable to form part of a floor of a gangway, which gangway is suitable to connect a first car with a second car and to allow passage of passengers from the first car to the second car. The structure 1 comprises a first elongated panel 2 that extends along a first longitudinal axis 3 and a second elongated panel 4 that extends along a second longitudinal axis 5 and an elongated end-panel 6 that extends along a third longitudinal axis 7. In the first operational mode shown in FIG. 1, the longitudinal axis 3, 5, 7 are in parallel.

FIG. 1 shows one half of the structure. The second half that extends behind the cut-line 8 shown in FIG. 1 is the mirror-image of the half shown in FIG. 1, the second half being in line-symmetry about the cut-line 8 to the visible half.

The first elongated panel 2 has a back 9, visible in the view of FIG. 1 and a front, not visible in the view of FIG. 1, which is arranged on the opposite side of the back 9. The second elongated panel 4 has a back 10, visible in the view of FIG. 1 and a front, not visible in the view of FIG. 1, which is arranged on the opposite side of the back 10. The elongated end-panel 6 has a back 11, visible in the view of FIG. 1 and a front, not visible in the view of FIG. 1, which is arranged on the opposite side of the back 11.

The first elongated panel 2 has a front end 12 and a back end arranged opposite the front end 12 in the direction perpendicular to the longitudinal axis 3, the back end not being visible because the first elongated panel 2 overlaps the second elongated panel 4 such that the back end of the first elongated panel 2 is in front of the front of the second elongated panel 4 and the front end 13 of the second elongated panel 4 is behind the back 9 of the first elongated panel 2. The second elongated panel 4 has a front end 13 and a back end arranged opposite the front end 13 in the direction perpendicular to the longitudinal axis 5, the back end not being visible because the second elongated panel 4 overlaps the elongated end-panel 6 such that the back end of the second elongated panel 4 is in front of the front of the elongated end-panel 6 and the front end 14 of the elongated end-panel 6 is behind the back 10 of the second elongated panel 4. The elongated end-panel 6 has a front end 14 and a back end 15 arranged opposite the front end 14 in the direction perpendicular to the longitudinal axis 7.

As can be seen from FIG. 1, the first elongated panel 2, the second elongated panel 4 and the elongated end-panel 6 are identical in shape and built.

The first elongated panel 2, the second elongated panel 4 and the elongated end-panel 6 each have an element 16 attached to them, whereby a part of the element 16 attached to the first elongated panel 2 reaches behind the back 10 of the second elongated panel 4 and a part of the element 16 attached to the second elongated panel 4 reaches behind the back of the elongated end-panel 6. The element 16 that reaches behind the back of the neighbouring panel is arranged at an angle relative to the longitudinal axis of the respective panels. The element 16 is used as a limiting device. The second elongated panel 4 has an abutment element 17 and the element 16 that is attached to the first elongated panel 2 and reaches behind the back of the second elongated panel 4 abuts against this abutment element 17 attached to the back of the second elongated panel 4 when the two panels 2, 4 reach a predetermined position relative to each other during the shear movement (FIG. 3). For shear movements in the opposite direction (FIG. 2) the elements 16 that reach behind the respective back of the respective neighbouring panel are designed such that the elements 16 of two neighbouring plates 2,4 abut against each other and thereby stop a further relative movement in the direction of the longitudinal axis.

The elements 16 that reach behind the back of the respective neighbouring elongated panel are of hook shape, the free end of the hook being behind the back of the neighbouring panel. This limits the movement of the neighbouring panel in one direction perpendicular to the longitudinal axis 3, 5, 7, for example when the front end 13 of the second elongated panel 4 makes contact with the base of the hook-shaped element 16 attached to the first elongated panel 2.

Figure 8:
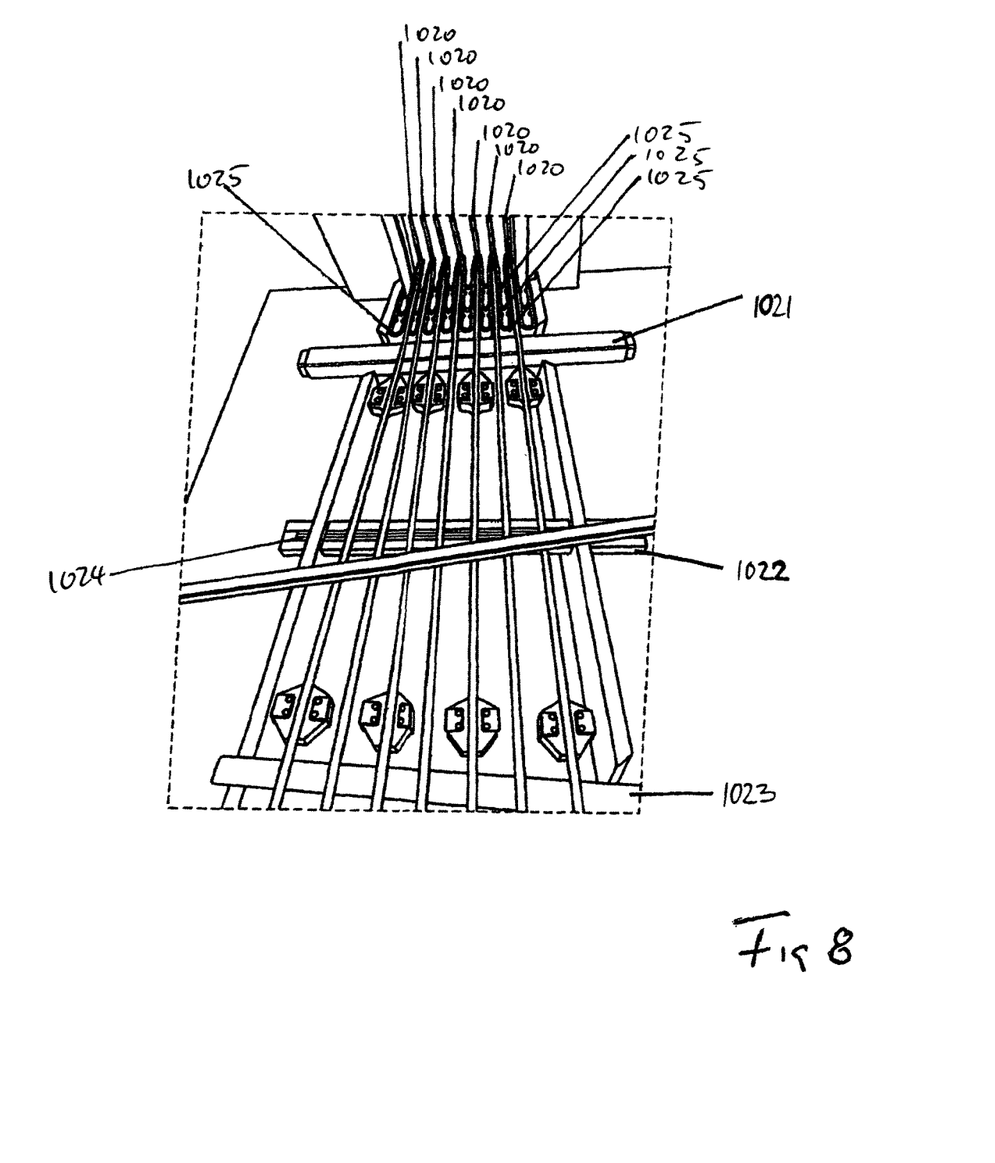
FIG. 8 shows a perspective view into the inside of a portion of a gangway according to the invention in an operational mode with the floor and the sidewalls having been removed for a better view onto the remaining parts and, FIG. 9 shows an additional aspect of a gangway according to the invention in a sectional view that shows a section of the bellows of a gangway.

The first elongated panel 2, the second elongated panel 4 and the elongated end-panel 6 have abutment elements 17. When built into a gangway, the abutment elements 17 can be used to support the first elongated panel 2, the second elongated panel 4 and the elongated end-panel 6 on beams of hoops of the gangway (FIG. 8).

FIG. 1 shows the structure 1 in a first operational mode. This is the operational mode that the structure will take up, when built into a gangway and the gangway is in the operational mode that the first car and the second car connected by the gangway are arranged in a straight line with the longitudinal axis of the cars being coaxial and the cars being on level ground.

Figure 2:
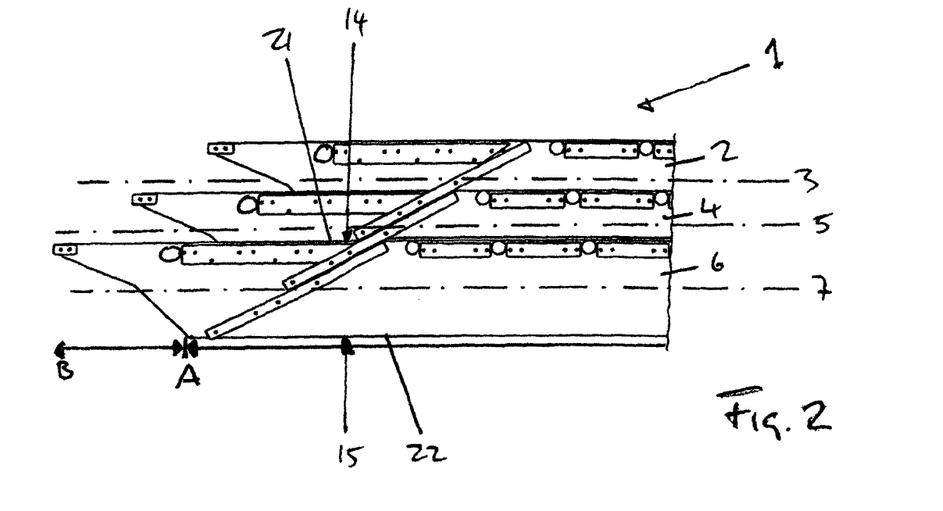
FIG. 2 shows a view from below onto a portion of the structure of FIG. 1 in a second operational mode.

FIG. 2 shows the structure 1 in a different operational mode. In this mode, the panels 2,4,6 have moved relative to each other along their respective longitudinal axis 3, 5, 7 in one direction (towards the right in FIG. 2). The longitudinal axis 3, 5, 7 are still parallel to each other. This is the operational mode that the structure 1 will take up, when built into a gangway and the gangway is in the operational mode that the first car and the second car connected by the gangway are offset to each other with their longitudinal axis being parallel and in the same horizontal plane, but not coaxial. The movement from the first operational mode to the operational mode shown in FIG. 2 can be called a shear movement. FIG. 3 shows a shear movement in the opposite direction along the longitudinal axis 3, 5, 7 of the panels 2, 4, 6.

By means of the arrow A FIG. 2 indicates the extend of central section 20 of the elongated end-panel 6 that is substantially rectangular. The substantially rectangular central section 20 has a first elongated side 21 that forms part of the front end 14 of the respective panel and has a second elongated side 22, parallel to the first side 21 that forms part of the back end 15 of the respective panel. By means of the arrow B FIG. 2 indicates the extend of a side end section of the elongated end panel 6 that extends along the respective longitudinal axis of the respective panel, whereby the width of the side end section in direction perpendicular to the respective longitudinal axis diminishes in the direction along the respective longitudinal axis. As can be seen in FIG. 4 this allows this end of the panel and the neighbouring ends of the neighbouring panels to be moved closer to each other without the side ends of the respective panels abutting against each other or disturbing the respective movement of the panel. The side end section has a front end that is in line with the front end 14 as it is defined by the first elongated side 21 of a central section that forms part of the panel. The width of the side end section thus diminishes by way of moving the back end closer towards the front end. The back end of the side end section is arranged at a steeper angle relative to the longitudinal axis for a part of the side end section that is closer to the central section. For a part of the side end section that is further away from the central section, the back end of the side end section is arranged at an angle shallower than the steeper angle relative to the longitudinal axis.

FIG. 4 shows the structure 1 in a different operational mode. In this mode, the panels 2,4,6 have moved relative to each other along in a swivel movement (spread out, fanned out). The longitudinal axis 3, 5, 7 are not parallel to each other anymore. This is the operational mode that the structure 1 will take up, when built into a gangway and the gangway is in the operational mode that the first car and the second car connected by the gangway are travelling around a bend. In the FIG. 4, the left hand side of the structure 1 will be at the side of the gangway that is on the inner side of the bend. In the FIG. 5, the left hand side of the structure 1 will be at the side of the gangway that is on the outer side of the bend.

Figure 6:
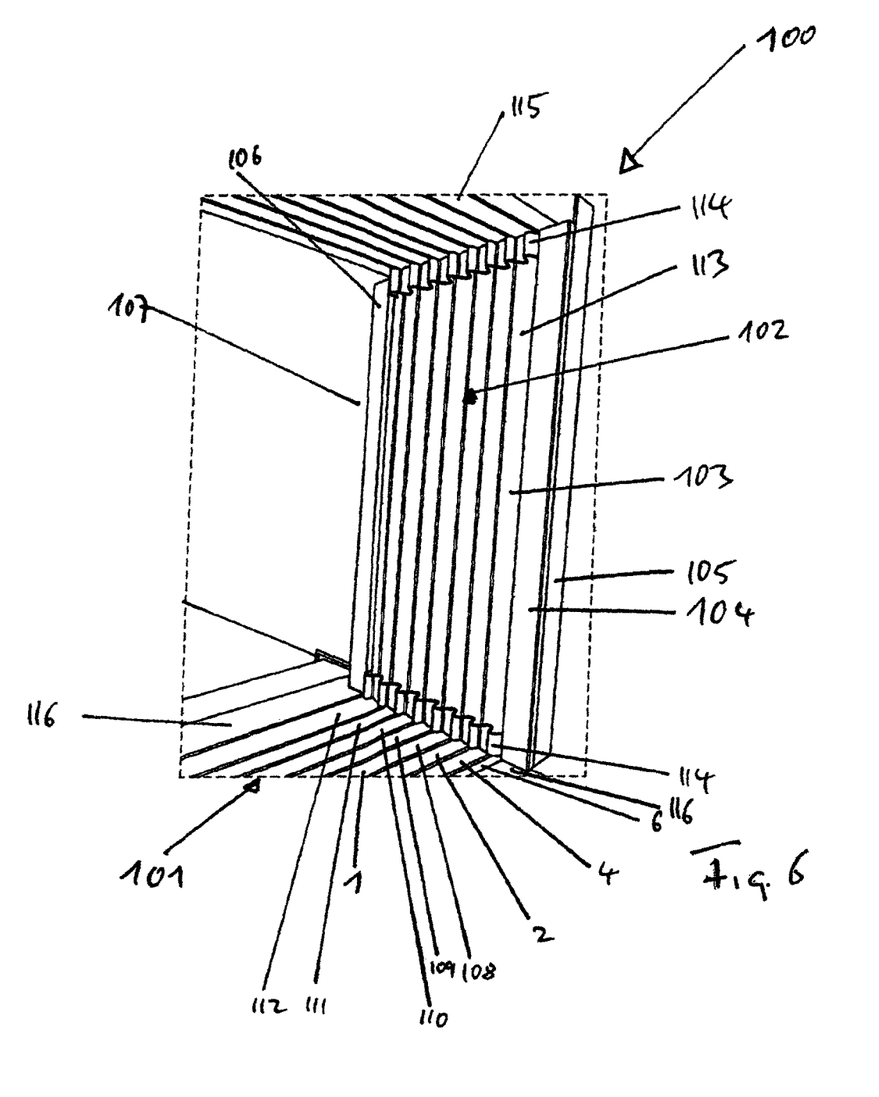
FIG. 6 shows a perspective view into the inside of a portion of a gangway in a first operational mode.

FIG. 6 shows a perspective view into the inside of a portion of a gangway 100 in a first operational mode. A first structure 1 forms part of the floor 101 of the gangway. A second structure 102 forms part of the sidewall 103 of the gangway. The gangway 100 has a first end frame 104 that is connected to a first car 105. At the opposite end of the gangway 100, a second end frame 106 is arranged that is connected to a second car 107. FIG. 6 shows the gangway 100 in the first operational mode that it will take up, when the first car 105 and the second car 107 connected by the gangway 100 are arranged in a straight line with the longitudinal axis of the cars being coaxial and the cars being on level ground as shown in FIG. 6.

FIG. 6 shows that the gangway is preferably realized with the structure 1 having more elongated panels than the first elongated panel 2, the second elongated panel 4 and the elongated end-panel 6. As shown in FIG. 6, the structure 1 has five more elongated panels, namely a third elongated panel 108, a fourth elongated panel 109, a fifth elongated panel 110, a sixth elongated panel 111 and a sevenths elongated panel 112. The further five elongated panels 108 to 112 are identical in structure and built to the panels 2, 4, 6 are arranged in the same overlapping manner as described with reference to the panels 2, 4, 6 in FIG. 1.

FIG. 6 shows that the structure 102 that forms part of the sidewall 103 has differently structured and built elongated panels 113, when compared to the panels 2, 4, 6, 108 to 112. However, with regard to their overlapping, the elongated panels 113 are arranged in the same manner as the panels 2, 4, 6, 108 to 112.

FIG. 6 shows that at the bottom and the top of the sidewall 103, protective rubber elements 114 are provided. These are elongated elements that grip around the bottom end and the top end respectively of the elongated panels 113. The protective rubber elements 114 close the gap between the bottom end and the top end respectively of the elongated panels 113 and the surface of the floor 101 and the lower surface of the ceiling 115 respectively. The elongated elements can also be made by way of providing each elongated panel with a central rubber boot protruding from the panel surface across the portion of the panel that is never obscured by the adjacent panel even under the worst movement case. This central boot can be flanked on either side by a compressible tubular or similar section that will abut a similar feature on the adjacent panels, thus creating an overhanging rubber edge that can accommodate all movement cases without creating a gap for passenger feet or other objects.

FIG. 6 shows a train designs are known, where a tread plate 116 is attached to the car 105 and where a tread plate 116 is attached to the car 107, the tread plates 116 resting on the floor of the gangway. The tread plate 116 attached to the car 107 rests on the end-panel 6.

FIG. 6 shows that the fronts of the elongated panels are facing inwards, the inside of the gangway being the free volume through which the passenger is intended to move from one car to the next car.

Figure 7:
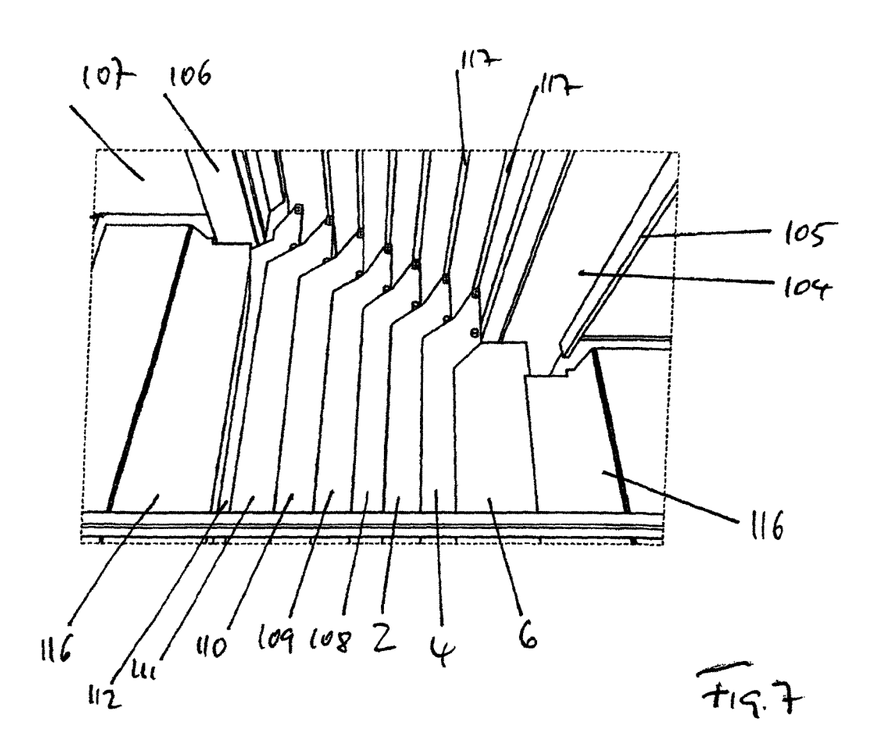
FIG. 7 shows a perspective view into the inside of a portion of a gangway in a second operational mode with the elongated panels of the sidewall having been removed for a better view onto the remaining parts.

FIG. 7 shows a perspective view into the inside of a portion of a gangway in a second operational mode with the elongated panels of the sidewall having been removed for a better view onto the remaining parts. The front end of the first elongated is supported by a first beam, the front end of the second elongated is supported by a second beam and the front end of the longitudinal end-panel is supported by an end beam, the first, second and end beam being arranged below the panels in the view of FIG. 7. The abutment elements 17 are arranged between the front end of the panel and the beam such that the basic body rests on the beam via the abutment elements. The beams are arranged to be movable relative to each other.

The first elongated is arranged in such a manner that it can swivel about an axis that is parallel to the first longitudinal axis. The second elongated is arranged in such a manner that it can swivel about an axis that is parallel to the second longitudinal axis. The first elongated panel 2 and the second elongated panel 4 each are connected in a pivotable manner to a vertically extending beam 117 at their respective side ends.

In a preferred embodiment the gangway according to the invention does not comprise a structure as it is shown as structure 1 or structure 102 in the FIGS. 1 to 7. In a preferred embodiment the gangway according to the invention does not comprise elongated panels as the are shown as elongated panels 2, 4, 6, 108 to 112 and 113 in FIGS. 1 to 7.

FIG. 8 shows a perspective view into the inside of a portion of a gangway according to the invention in an operational mode that would be equivalent to the one the gangway would take up when built into a train that goes around a bend. The floor and the sidewall of the gangway and have been removed for a better view onto the remaining parts. FIG. 8 shows that the gangway 1000 has a series of hoops 1020. The hoops have an essentially rectangular shape. FIG. 8 shows the lower beam (lower longitudinal section; a section of the hoop that extends along a straight line) and the one vertical beam (side longitudinal section; a further section of the hoop that extends along a straight line) of the rectangular hoop, the top beam (upper longitudinal section; a further section of the hoop that extends along a straight line) and the second vertical beam (a further side longitudinal section; a further section of the hoop that extends along a straight line) not being visible in the view shown in FIG. 8. The hoops are made up of joint together beams. The floor (not show) is supported by the lower, horizontal beams of the hoops 1020.

Elastic elements 1025 made of bend elastic bands are arranged between the beams in a horse shoe-shape, the elongated linear parts of the horse shoe being attached to the respective beam. Three of such horse shoe shaped elastic elements are arranged between respective beams per side of the gangway. The lower, horizontal beam 1020 has a hole. An alignment beam 1022 passes through the respective hole in each respective beam. The alignment beam 1022 is arranged approximately in the middle of lower, horizontal beam. Two support beams 1021, 1023 are arranged towards the side end sections of the respective beams. The hoops 1020 rest on the support beams 1021 and 1023.

Elements 1025 are arranged protruding a first distance from the lower, horizontal beams of the hoops 1020 such as to prevent the lower, horizontal beam of a neighbouring hoop 1020 to come closer to the respective lower, horizontal beam of the respective hoop 1020 as the first distance. The element 1025 has a tapered shape. The element 1025 has an elastic coating.

Figure 9:
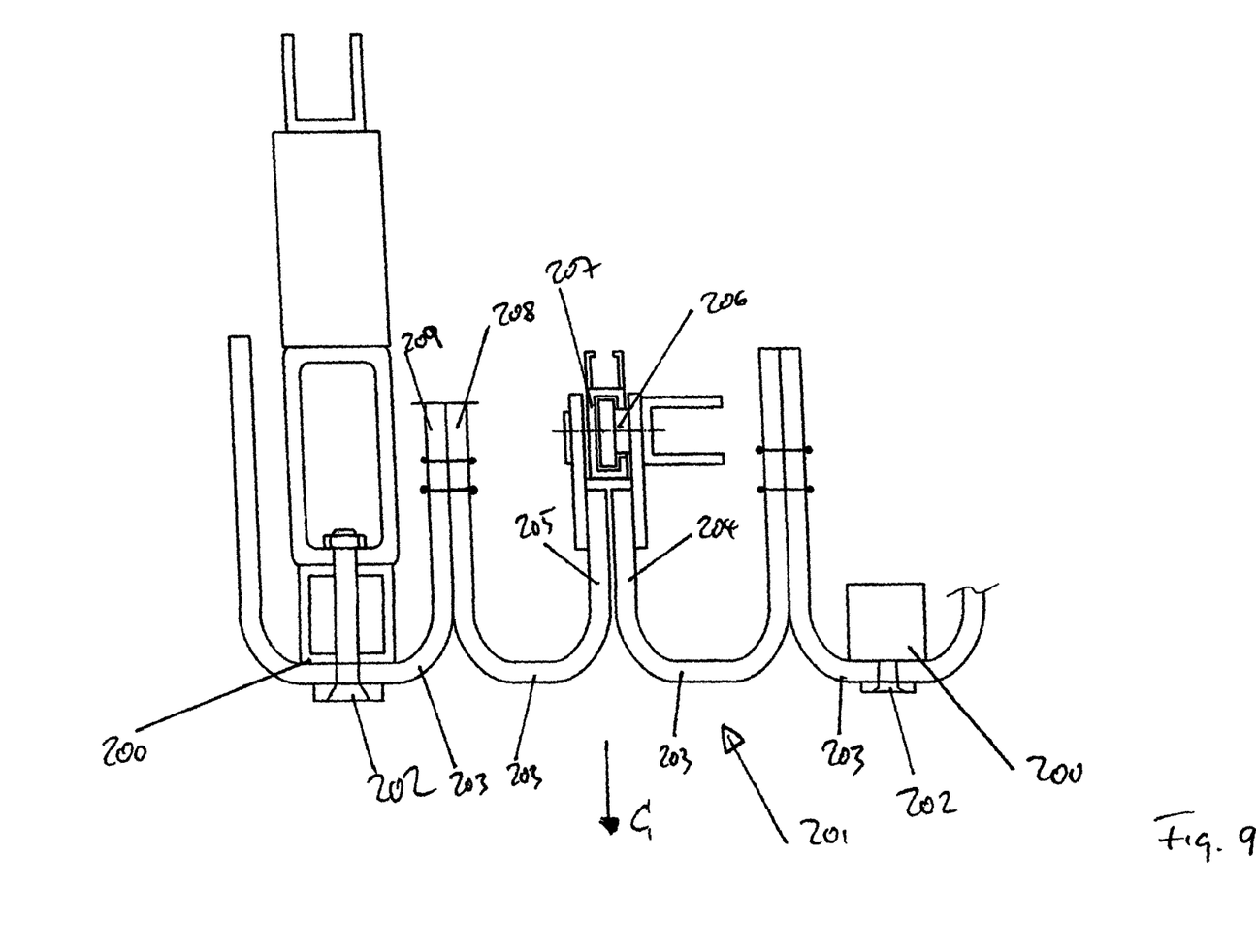

FIG. 9 shows a further alternative or additional aspect of a gangway according to the invention in a sectional view that shows a section of the bellows of a gangway. FIG. 9 shows horizontally orientated beams 200. These beams form the top beams of the hoops of which FIG. 8 shows the lower beam and the one vertical beam of the rectangular hoop. The arrow C indicates in inward facing direction (the inside of the gangway being the free volume through which the passenger is intended to move from one car to the next car). FIG. 9 also shows an inner bellows 201 of the gangway that is attached to the horizontal beams by means of screws 202. The inward facing bellows 201 is made up of a series of convolutes 203. The convolutes 203 are made from rubber-material. The convolutes 203 approximately have the cross-sectional shape of a horse-shoe. A first convolute 203 is connected to a second neighbouring convolute 203 by means of attaching the one elongated section 204 of the first horse-shoe shaped convolute 203 to one elongated section 205 of the second horse-shoe shaped convolute 203. The connection is formed by protruding elements 206 that are connected to the one elongated section 204 of the first horse-shoe shaped convolute 203 and a channel 207 connected to one elongated section 205 of the second horse-shoe shaped convolute 203. The protruding element 206 is held inside the channel 207 in such a manner that the protruding element 206 can slide along the channel 207, thereby allowing the one elongated section 204 of the first horse-shoe shaped convolute 203 to slide relative to the one elongated section 205 of the second horse-shoe shaped convolute 203.

The other elongated section 208 of the second horse-shoe shaped convolute 203 is fixedly connected to one elongated section 209 of a third horse-shoe shaped convolute 203 in that the other elongated section 208 and one elongated section 209 are sewn together.

The invention claimed is:

1. A gangway for connecting cars of a multi-car vehicle, comprising:
    a first hoop at a first end of the gangway, configured to be connected to a first car;
    a second hoop at a second end of the gangway, opposite to the first end, configured to be connected to a second car;
    a support beam;
    a third hoop and a fourth hoop, resting on the support beam, and intermediate the first hoop and the second hoop;
    wherein each of the hoops has a generally rectangular shape and envelopes an area large enough for a passenger to pass through;
    a connection element elastically connecting the third hoop and the fourth hoop into a predetermined orientation relative to each other; and
    a floor supported on the hoops.

2. The gangway of claim 1, wherein the third and fourth hoops are arranged to travel freely along the support beam.

3. The gangway of claim 2, wherein the third and fourth hoops are arranged to swivel relative to the support beam.

4. The gangway of claim 1, further comprising a second support beam, the third and fourth hoops resting on the support beam and the second support beam.

5. The gangway of claim 1, further comprising three further hoops intermediate the first hoop and the second hoop.

6. The gangway of claim 5, further comprising connection elements between each pair of neighboring hoops, the connection elements configured to cause the sides of the hoops to be held equidistantly apart from each other.

7. The gangway of claim 1, wherein each of the generally rectangular hoops has four corners, and a connection element is arranged in each of two of the corners of each of the hoops.

8. The gangway of claim 7, wherein a connection element is arranged in each of the corners of each of the hoops.

9. The gangway of claim 1, wherein the connection element comprises at least one of a coil spring, a spring leave, a horseshoe-shaped elastic element or a ring-shaped elastic element.

10. The gangway of claim 1, wherein each of the hoops has a section extending along a straight line, and having a height of less than 50 cm.

11. A gangway for connecting cars of a multi-car vehicle, comprising:
    a first hoop at a first end of the gangway, configured to be connected to a first car;
    a second hoop at a second end of the gangway, opposite to the first end, configured to be connected to a second car;
    a third hoop and a fourth hoop, intermediate the first hoop and the second hoop;
    wherein each of the hoops envelopes an area large enough for a passenger to pass through; and
    a connection element elastically connecting the third hoop and the fourth hoop into a predetermined orientation relative to each other.

12. The gangway of claim 11, further comprising three further hoops intermediate the first hoop and the second hoop.

13. The gangway of claim 11, further comprising connection elements between each pair of neighboring hoops, the connection elements configured to cause the sides of the hoops to be held equidistantly apart from each other.

14. The gangway of claim 11, wherein each of the generally rectangular hoops has four corners, and a connection element is arranged in each of two of the corners of each of the hoops.

15. The gangway of claim 14, wherein a connection element is arranged in each of the corners of each of the hoops.

16. The gangway of claim 11, wherein the connection element comprises at least one of a coil spring, a spring leave, a horseshoe-shaped elastic element or a ring-shaped elastic element.

17. The gangway of claim 11, wherein each of the hoops has a section extending along a straight line, and having a height of less than 50 cm.

* * * * *